Jan. 4, 1966 — D. P. STOCKWELL — 3,227,339
CAR RACK FOR SKIS OR THE LIKE
Filed July 16, 1963

INVENTOR.
DAVID P. STOCKWELL
BY
McCormick, Paulding & Huber
ATTORNEYS

United States Patent Office 3,227,339
Patented Jan. 4, 1966

3,227,339
CAR RACK FOR SKIS OR THE LIKE
David P. Stockwell, 12 Skyline Drive,
Farmington, Conn.
Filed July 16, 1963, Ser. No. 295,352
2 Claims. (Cl. 224—42.1)

This invention relates to car top carriers for luggage or the like, and more particularly, to a novel supporting structure for such a carrier.

A general object of the present invention is to provide a supporting structure for a car top carrier which may be easily attached to or removed from the roof of a car having conventional rain gutters or the like.

Another general object of the present invention is to provide an inexpensive supporting structure for a car top carrier which is lightweight and compact so as to be easily stored inside the car when not in use.

A still further object of the present invention is to provide a supporting structure which may be used with a pair of skis or the like forming a complete means for transporting the skis on the top of a car.

A still further object of the present invention is to provide a supporting structure which may be used in pairs with any elongated articles therebetween to serve as a complete car top luggage carrier or rack.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
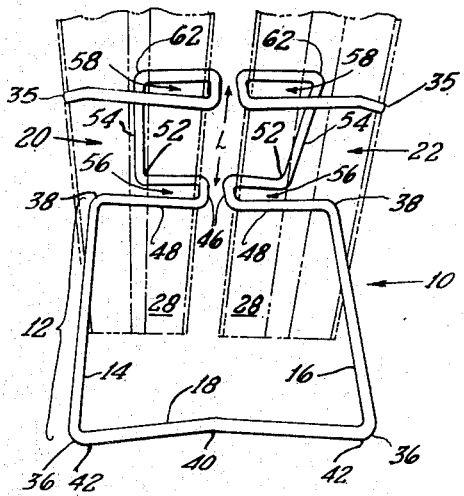
FIG. 1 is a perspective view of a preferred embodiment of the supporting structure of the present invention.
Figure 2:
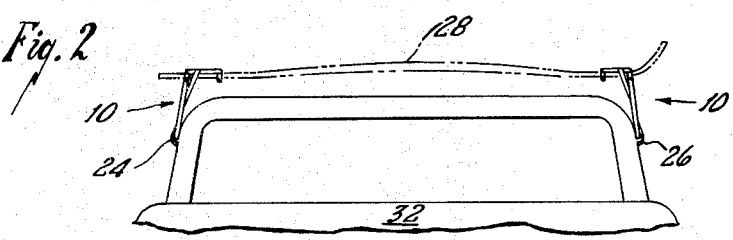
FIG. 2 is a rear view of a car to which a pair of supports such as that shown in FIG. 1 have been attached according to the present invention.
Figure 3:
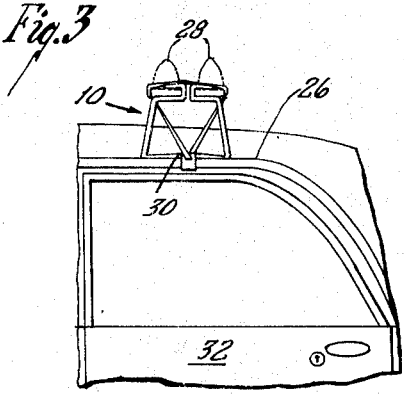
FIG. 3 is a side view of the car of FIG. 2 showing the support and attachment means therefor.
Figure 4:
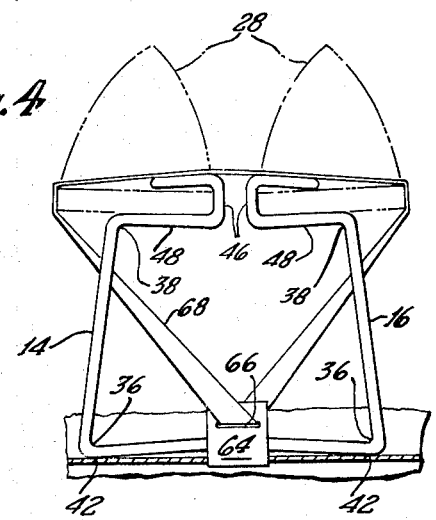
FIG. 4 is an enlargement of FIG. 3.

As shown in FIG. 1 the supporting structure 10 comprises a generally vertical portion 12 having a pair of generally vertical members or upwardly extending legs 14 and 16, which are joined at their lower ends by a vertical support foot portion 18. The upper ends of these legs 14 and 16 are integrally connected to oppositely arranged horizontally disposed clip means 20, 22. The two clip means are adapted to releasably receive two elongated members such as skis or the like and said clip means extend laterally inwardly out of the generally vertical plane defined by said vertical support legs and foot portion. As so constructed two such supporting structures 10, 10 can be placed in the laterally spaced longitudinally extending rain gutters 24 and 26 to be found on most present day cars and a pair of skis 28, 28 can be accommodated in the clip means as shown in FIG. 2. It will be apparent that the lateral spacing of these supports 10, 10 is not a critical dimension of the car top carrier so formed and that the spacing can be readily varied to fit any model or make of automobile. It will also be apparent that skis need not be used but on the contrary any elongated article could be employed to span the lateral distance between the supports 10, 10 and that by using four such supports a car top carrier could be constructed to handle almost any size or weight of load. Thus, it will be understood that although the present construction is perhaps best suited to functioning in pairs for use as a ski rack, having clip means to accommodate a pair of skis, the invention should not be so narrowly construed being equally applicable to use in groups of four or more in conjunction with two or more elongated articles to carry other loads such as luggage or the like. As best shown in FIGS. 3 and 4 attachment means 30 are provided between the rain gutter 26 and the upper end of the supporting structure 10 to releasably attach the combined skis and supporting structure 10 to a car 32.

Turning now to the supporting structure 10 in greater detail, the entire structure, exclusive of skis and attachment means, will be seen to comprise a continuous length of relatively stiff wire 35 the diameter of which is preferably no greater than the inside diameter of a typical rain gutter and no less than required for supporting a pair of skis or other load to be carried on a car top carrier of the present invention. As best shown in FIGS. 1 and 4 this wire has two bends 36, 36 of nearly 90° which define the foot portion 18 therebetween and two more bends 38, 38 of approximately 90° which when taken with said first mentioned bends 36, 36 define said support legs 14 and 16 therebetween. A slight bend 40 of approximately 10° at the midpoint of said wire 35, and of said foot portion 18, defines two spaced knees 42, 42 adjacent said first mentioned bends 36, 36. As so constructed the foot portion 18 is well adapted to fit not only the flat portion of a car rain gutter but also to fit an arcuate portion thereof, the said knees 42, 42 providing longitudinally spaced point contacts for the vertical support 12 with a resulting high degree of stability and rigidity when used in conjunction with the attachment means 30 which are adapted to grip the outside of said rain gutter at a point approximately midway between said knees 42, 42. Alternatively, the attachment means could be connected to any part of the car, such as the edge of a doorway or the like.

With further reference to the single wire construction illustrated, two symmetrically arranged 180° bends 46, 46 when taken with the right angle bends 38, 38 define two generally horizontal lengths 48, 48. These lengths together with the above-mentioned support legs 14 and 16 and the foot portion 18 define the vertical portion 12 referred to hereinabove. In addition, these lengths 48, 48 also serve as part of the clip means 20, 22 which are adapted to receive the skis 28, 28. As best shown in FIG. 1 these clip means are similar in every material respect differing only in that the open end of each faces in an opposite direction, the said 180° bends 46, 46 being arranged back to back. These 180° bends 46, 46 together with two right angle bends 52, 52 made out of the plane of said vertical support 12 define two more horizontal lengths 54, 54 which when taken with the horizontal lengths 48, 48 first mentioned and the 180° bends 46, 46 therebetween form a first set of generally U-shaped ski receiving portions 56, 56. As mentioned these U-shaped portions lie in a common plane with the vertical support portion 12 but such is not essential to the present invention and this portion of the clip means 20, 22 may be spaced laterally from said plane without departing from the scope of the invention, it being sufficient that said portions lie adjacent the upper ends of said support legs 14 and 16 so as to be rigidly connected thereto.

In accordance with the present invention a second set of U-shaped ski portions 58, 58 are also provided at a spaced lateral distance L from said first mentioned U-shaped portions 56, 56. As shown the second set 58, 58 are formed in a manner similar to the first set 56, 56 and are separated therefrom by two laterally extending horizontal members in the form of two lengths of wire 60, 60 defined by said right angle bends 52, 52 and two more right angle bends 62, 62. The distance L is determined by said wire lengths 60, 60 and is preferably on the order of one half the height of said support legs 14 and 16 as best shown in FIG. 2. Although other dimensional relations may be chosen it has been found that this proportion will result in a convenient size rack for use with skis of conventional size.

As so constructed insertion of a pair of skis 28, 28 or other elongated articles in the clip means 20, 22 permits the support 10 to be moved longitudinally of the skis but does not permit the support to be rotated with respect to the skis. As so arranged two such supports are well adapted to being adjusted relative to a pair of skis until the feet portions 18, 18 thereof are accurately aligned with the car's rain gutters 24 and 26. The resulting structure is seen to be self-supporting in that the skis 28, 28 assist in retaining the supports 10, 10 in position in their respective gutters 24 and 26.

In order to securely attach the skis and the supporting structure of the present invention to the car roof, means are provided for releasably attaching the supports 10, 10 to the gutters 24 and 26. As shown said attachment means 30 comprises a gutter engageable clip 64 having an elongated slot 66 at an upper end to receive an elastic strap 68 which is adapted to encircle an upper end of the ski supporting structure as best shown in FIG. 4. As so arranged the strap 68 not only provides an attachment means which is adjustable between the upper end of the ski support structure and said gutter, but said strap also functions as a means for holding the skis in the U-shaped portions mentioned previously. It will be apparent that other means for attaching the supports to the car roof as well as other clip means for holding the skis fast to these supports, may be devised but the construction described herein is the preferred one offering a simple and straight forward means for accomplishing both of these functions.

The invention claimed is:

1. In a car top carrier for use on a car having a longitudinal rain gutter on each side, the combination comprising at least one vertical one piece wire support associated with each gutter and having a foot portion intermediate the ends thereof adapted to stand in the associated gutter, two generally upwardly extending wire legs integrally connected at their lower ends to said foot portion and defining a generally vertical plane extending generally longitudinally of the car, a first pair of wire lengths each of which is integrally connected to the upper ends of said legs and extends longitudinally towards the other in said vertical plane, a second pair of said wire lengths each of which is generally parallel to and vertically spaced from one of said first lengths, a pair of 180° bends of said wire serving to integrally connect said parallel wire lengths so as to form a first set of oppositely disposed U-shaped portions adapted to receive a pair of skis or other similar article in a generally perpendicular relation to said vertical plane, a second set of similarly constructed U-shaped portions spaced laterally from said first set and from said vertical plane, two laterally extending wire lengths each of which is integrally connected at one end to one of said first set of U-shaped portions and at the other end to the corresponding one of said second set of U-shaped portions whereby each of said supports is constructed from a single piece of wire and adapted to being releasably clipped to spaced locations on a pair of skis extending generally horizontally and laterally across a car, and means for releasably strapping said skis and said supports to the car in the relationship set forth above.

2. In a car top carrier for use on a car having a longitudinal rain gutter on each side, the combination comprising at least one vertical support associated with each gutter and having a foot portion standing in the associated gutter, the upper portion of each vertical support being shaped to provide releasable clip means engageable with an article that can be extended generally horizontally across the car top for engagement with a vertical support at each side of the car to be supported thereby and to assist in retaining the supports in position in the respective gutters, said clip means including a first set of oppositely disposed U-shaped portions adapted to receive a pair of generally horizontal skis arranged in side-by-side relationship, each of said portions being integrally connected with said foot portions by a pair of generally vertical legs, and a second set of oppositely disposed U-shaped portions each of which is generally parallel to and laterally spaced from a corresponding U-shaped portion in said first set and integrally connected thereto by a generally horizontal length of wire, each of said foot portions including two longitudinally spaced knees adapted to contact spaced points inside said rain gutter, said knees being defined by two generally right angle bends in a single piece of wire whereby each of said supports is adapted to being constructed from said single piece of wire, and means for releasably strapping the said article and supports to the car in the relationship set forth above.

References Cited by the Examiner

UNITED STATES PATENTS 1,748,282   2/1930   Ellis.
2,659,464   11/1953  Sweetman.

FOREIGN PATENTS 103,503   1/1942   Sweden.
342,096   12/1959  Switzerland.

GERALD M. FORLENZA, *Primary Examiner.*

HUGO O. SCHULZ, *Examiner.*